(12) United States Patent
Kobayashi et al.

(10) Patent No.: US 11,443,870 B2
(45) Date of Patent: Sep. 13, 2022

(54) COMPOSITE CABLE

(71) Applicants: SUMITOMO WIRING SYSTEMS, LTD., Mie-ken (JP); SUMITOMO ELECTRIC INDUSTRIES, LTD., Osaka (JP)

(72) Inventors: Kenta Kobayashi, Yokkaichi (JP); Jo Yagisawa, Kanuma (JP); Masayuki Ishikawa, Kanuma (JP); Takumi Ooshima, Kanuma (JP)

(73) Assignees: SUMITOMO WIRING SYSTEMS, LTD., Yokkaichi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/295,879

(22) PCT Filed: Nov. 28, 2019

(86) PCT No.: PCT/JP2019/046474
§ 371 (c)(1),
(2) Date: May 21, 2021

(87) PCT Pub. No.: WO2020/111162
PCT Pub. Date: Jun. 4, 2020

(65) Prior Publication Data
US 2022/0020510 A1    Jan. 20, 2022

(30) Foreign Application Priority Data

Nov. 30, 2018  (JP) .............................. JP2018-224691

(51) Int. Cl.
H01B 7/04    (2006.01)
H01B 7/18    (2006.01)
(Continued)

(52) U.S. Cl.
CPC ........... H01B 7/1815 (2013.01); B60R 16/03 (2013.01); H01B 7/0225 (2013.01)

(58) Field of Classification Search
CPC ............ H01B 7/04; H01B 11/04; H01B 11/06
See application file for complete search history.

(56) References Cited

U.S. PATENT DOCUMENTS 3,678,177 A * 7/1972 Lawrenson ............ H01B 11/00
                                                174/113 C
6,448,500 B1 * 9/2002 Hosaka .................. H01B 11/08
                                                174/113 R
(Continued)

FOREIGN PATENT DOCUMENTS

JP    2016-110836     *  6/2016
WO    2018-198475 A1    11/2018

Primary Examiner — Chau N Nguyen

(57) ABSTRACT

A composite cable includes an electric wire bundle, and an outer layer sheath covering the electric wire bundle. The electric wire bundle includes a one-core first electric wire, a one-core second electric wire, a two-core twisted pair electric wire, a one-core third electric wire, and one wire-like interposed material formed in the shape of a wire using a polymer. In the electric wire bundle, in a cross sectional view the twisted pair electric wire is disposed on one side of a centerline joining the center of the first electric wire and the center of the second electric wire, and the third electric wire and the wire-like interposed material are disposed on the other side of the centerline.

11 Claims, 3 Drawing Sheets

(51) Int. Cl.
*B60R 16/03* (2006.01)
*H01B 7/02* (2006.01)

(56) References Cited

U.S. PATENT DOCUMENTS

| | | |
|---|---|---|
| 9,000,301 B2 | 4/2015 | Hayakawa et al. |
| 9,463,756 B2 | 10/2016 | Hayakawa et al. |
| 9,545,888 B2 | 1/2017 | Ito et al. |
| 9,862,336 B2 | 1/2018 | Hayakawa et al. |
| 9,902,347 B2 | 2/2018 | Hayakawa et al. |
| 10,163,547 B2 | 12/2018 | Hayakawa et al. |
| 10,279,756 B2 | 5/2019 | Hayakawa et al. |
| 2016/0176369 A1* | 6/2016 | Ito .................. B60R 16/0207 174/72 A |
| 2017/0263353 A1* | 9/2017 | Hayakawa .......... B60R 16/0207 |
| 2018/0026402 A1* | 1/2018 | Zebhauser .......... H01R 13/6581 439/607.5 |
| 2018/0281706 A1* | 10/2018 | Kobayashi ............. B60R 16/03 |
| 2019/0210543 A1 | 7/2019 | Hayakawa et al. |

\* cited by examiner

COMPOSITE CABLE

TECHNICAL FIELD

The present disclosure relates to a composite cable.

BACKGROUND ART

In the field of vehicles such as automobiles, a typical composite cable has a multicore structure in which a sheath entirely covers the circumference of electric wires.

Patent Document 1 discloses a composite cable that includes an electric brake cable, an anti-lock braking system (ABS) sensor cable, and an external sheath. The electric brake cable includes a pair of power wires. The ABS sensor cable includes a pair of signal wires. The external sheath entirely covers the electric brake cable and the ABS sensor cable. Further, Patent Document 1 describes that other insulated electric wires such as a wire breakage detection wire and the like can be integrated in addition to the electric brake cable and the ABS sensor cable in the composite cable.

PRIOR ART LITERATURE

Patent Document

Patent Document 1: Japanese Laid-Open Patent Publication No. 2013-237428

SUMMARY OF THE INVENTION

Problems that the Invention is to Solve

In the composite cable, electric wires are combined to form an electric wire bundle. Accordingly, even when a tape member or the like is wound around the surface of the electric wire bundle, the cross section of the electric wire bundle is not likely to be circular. In this case, rigidity is unevenly distributed in the circumferential direction of the composite cable. When the cable is repetitively bent such that the bending is concentrated in a direction in which the rigidity is relatively low, conductors will easily break. When an electric wire bundle such as that described in Patent Document 1 includes a pair of power wires and a pair of signal wires, the same problem may also occur if a single electric wire is further added to the electric wire bundle instead of adding another pair of signal wires.

Further, in the field of vehicles such as automobiles, a bracket including a crimp may be attached to the vehicle body or the like to crimp and fasten a composite cable with the crimp of the bracket. In this case, the applied fastening force may be uneven due to the difficulty in maintaining the cable shape of the conventional composite cable.

In this respect, the objective of the present disclosure is to provide a composite cable that easily reduces concentrated bending in a certain direction when the cable is repetitively bent and easily stabilizes the fastening force when the cable is crimped by a bracket.

Means for Solving the Problems

In a mode of the present disclosure, a composite cable includes an electric wire bundle and an outer layer sheath that covers the electric wire bundle, in which:

the electric wire bundle includes a single-core first electric wire, a single-core second electric wire, a double-core twisted pair wire, a single-core third electric wire, and a wire-shaped interposed material formed in a shape of a wire using a polymer;

in a cross-sectional view of the electric wire bundle, the twisted pair wire is arranged at one side relative to a center line connecting a center of the first electric wire and a center of the second electric wire, and the third electric wire and the wire-shaped interposed material are arranged at the other side relative to the center line.

Effects of the Invention

The above-described composite cable reduces concentrated bending in a certain direction when the cable is repetitively bent and stabilizes the fastening force when the cable is crimped by a bracket.

MODES FOR CARRYING OUT THE INVENTION

Description of Embodiment of Present Disclosure

Figure 1:
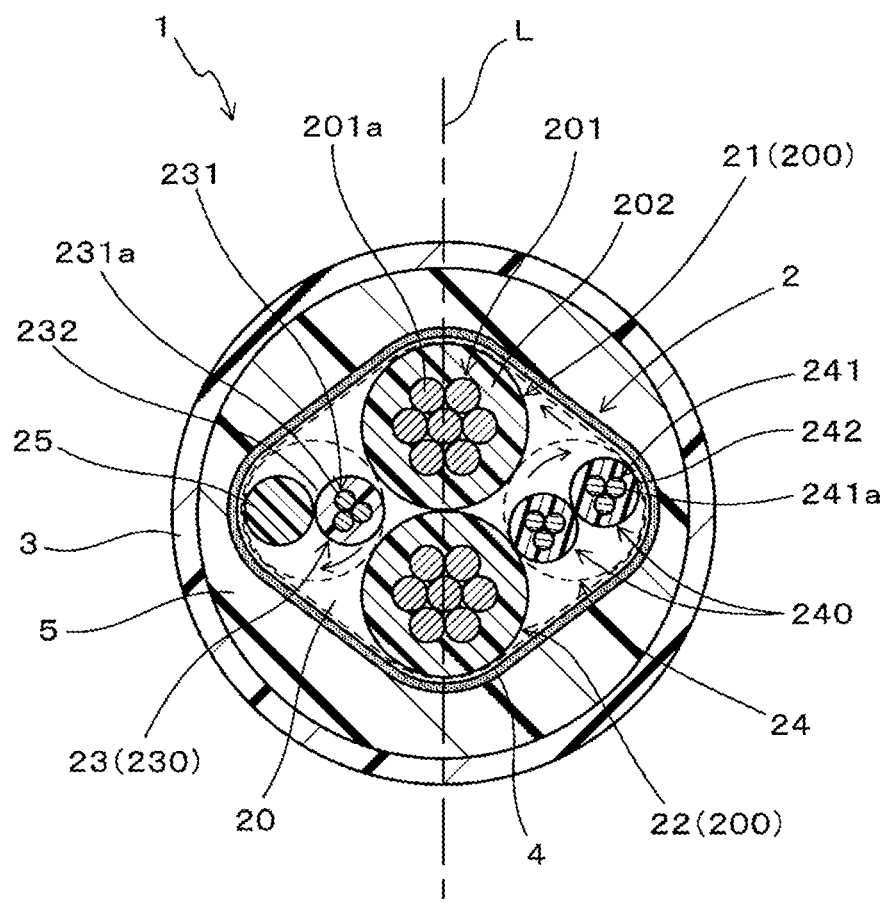
FIG. 1 is a schematic diagram showing the cross section of a composite cable in accordance with a first embodiment.

An embodiment of the present disclosure will now be described.

A composite cable of the present disclosure includes an electric wire bundle and an outer layer sheath that covers the electric wire bundle, in which:

the electric wire bundle includes a single-core first electric wire, a single-core second electric wire, a double-core twisted pair wire, a single-core third electric wire, and a wire-shaped interposed material formed in a shape of a wire using a polymer;

in a cross-sectional view of the electric wire bundle, the twisted pair wire is arranged at one side relative to a center line connecting a center of the first electric wire and a center of the second electric wire, and the third electric wire and the wire-shaped interposed material are arranged at the other side relative to the center line.

In the composite cable of the present disclosure, the third electric wire is arranged in the electric wire bundle in addition to the first electric wire, the second electric wire, and the twisted pair wire. The wire-shaped interposed material is also arranged together with the third electric wire. Further, the third electric wire and the wire-shaped interposed material are arranged at the side of the first electric wire and the second electric wire opposite to the twisted pair wire. Thus, compared to when the wire-shaped interposed material is not included, rigidity is evenly distributed in the circumferential direction of the composite cable. This reduces situations in which the cable is bent only in a certain direction. Therefore, compared to when the wire-shaped interposed material is not included, the composite cable reduces concentrated bending in a direction in which the rigidity is relatively low when the cable is repetitively bent and easily avoids wire breakage of the conductors.

Further, even when the composite cable of the present disclosure is fastened by a crimp of a bracket, the wire-shaped interposed material, which is formed from a polymer and arranged as described above, will deform to maintain the cable shape. Thus, compared to when the wire-shaped interposed material is not included, the composite cable readily maintains the cable shape and stabilizes the fastening force.

In the composite cable of the present disclosure, the third electric wire and the wire-shaped interposed material may be twisted together to form a strand.

In the composite cable of the present disclosure, the strand may have a strand diameter that is substantially equal to that of the twisted pair wire.

In the composite cable of the present disclosure, the wire-shaped interposed material may have a diameter that is substantially equal to that of the third electric wire.

In the composite cable of the present disclosure, the first electric wire, the second electric wire, the twisted pair wire, the third electric wire, and the wire-shaped interposed material may be twisted together.

The composite cable of the present disclosure may be configured so that the wire-shaped interposed material does not break when wire breakage occurs in a conductor of the twisted pair wire.

The composite cable of the present disclosure may include a separator layer wound around a circumferential surface of the electric wire bundle.

The composite cable of the present disclosure may be configured so that the separator layer has a contour that is non-circular in the cross-sectional view.

The composite cable of the present disclosure be configured so that an inner side of the separator layer may include a space.

The composite cable of the present disclosure may include an inner layer sheath between an inner surface of the outer layer sheath and the electric wire bundle.

The composite cable of the present disclosure may be configured so that the inner layer sheath has a contour that is circular in the cross-sectional view.

In the composite cable of the present disclosure, the first electric wire and the second electric wire may each be a power line, and the twisted pair wire may be formed by twisting two signal wires.

The composite cable of the present disclosure may be configured for use with an electric brake of an automobile.

Detailed Description of Embodiments of Present Disclosure

Specific examples of the composite cable of the present disclosure will now be described with reference to the drawings. The present invention is not limited to the illustrated embodiments and intended to be defined by the claims and their equivalents, and all variations within the scope of the claims and their equivalents.

First Embodiment

A composite cable of a first embodiment will now be described with reference to FIGS. 1 and 2. As exemplified in FIG. 1, a composite cable 1 of the present embodiment includes an electric wire bundle 2 and an outer layer sheath 3. The electric wire bundle 2 includes a single-core first electric wire 21, a single-core second electric wire 22, a double-core twisted pair wire 24, a single-core third electric wire 23, and a wire-shaped interposed material 25. The dotted lines in the drawing indicate twisting. Also, an arrow in the vicinity of the dotted lines indicates the twisting direction.

The background of the composite cable 1 in accordance with the present embodiment will now be described.

The inventors of the present invention have attempted to uniformly distribute the rigidity of the composite cable 1 in the circumferential direction to improve the bendability of the composite cable 1 and avoid wire breakage of conductors 241 and 201 caused by concentrated bending.

If the twisted pair wire 24, the third electric wire 23, and the wire-shaped interposed material 25 were to be twisted together, the electric wire bundle 2 would have a balanced layout and twisting undulation would not occur. Also, the diameter of the composite cable 1 can be decreased. However, the present inventors have conducted studies and found that when the twisted pair wire 24, the third electric wire 23, the wire-shaped interposed material 25 are twisted together, the bendability of the composite cable 1 will be decreased. This is most likely because of the limit in movement of the electric wires.

Accordingly, the present inventors have set a uniform width for the coating of the composite cable 1 and shaped the electric wire bundle 2 to be circular so as to uniformly distribute rigidity in the circumferential direction of the composite cable 1. Further, to improve the bendability, the present inventors have surrounded and covered the electric wire bundle 2 with an inner layer sheath 5 and arranged the wire-shaped interposed material 25 to obtain the composite cable 1 of the present embodiment.

The first electric wire 21 and the second electric wire 22 may each be formed by an insulated electric wire 200. The insulated electric wire 200 includes a conductor 201 and an insulator 202 that covers the circumference of the conductor 201. The conductor 201 may be formed by a stranded conductor including a strand of metal wires 201a. Each of the metal wires 201a may be formed from, for example, copper, a copper alloy, aluminum, an aluminum alloy, or the like. The insulator 202 may be formed from polyethylene, cross-linked polyethylene, or the like. The first electric wire 21 and the second electric wire 22 may have the same diameter or different diameters. In the example shown in FIG. 1, the first electric wire 21 and the second electric wire 22 have the same diameter. Specifically, the first electric wire 21 and the second electric wire 22 may each be a power line.

The twisted pair wire 24 may be formed by two insulated electric wires 240 that are twisted helically. Each of the insulated electric wires 240 includes a conductor 241 and an insulator 242 that covers the circumference of the conductor 241. The conductor 241 may be formed by a stranded conductor including a strand of metal wires 241a. Each of the metal wires 241a may be formed from, for example, copper, a copper alloy, aluminum, an aluminum alloy, or the like. The insulator 242 may be formed from polyethylene, cross-linked polyethylene, or the like. The two insulated electric wires 240 of the twisted pair wire 24 may have the same diameter or different diameters. In the example shown in FIG. 1, the two insulated electric wires 240 of the twisted pair wire 24 have the same diameter. Further, in FIG. 1, the diameter of each of the two insulated electric wires 240 forming the twisted pair wire 24 is smaller than the diameter of the first electric wire 21 and the second electric wire 22. Specifically, the twisted pair wire 24 may be formed by twisting two signal wires.

The third electric wire 23 may be formed by an insulated electric wire 230 that includes a conductor 231 and an insulator 232. The insulator 232 covers the circumference of the conductor 231. The conductor 231 may be formed by a stranded conductor including a strand of metal wires 231a. Each of the metal wires 231a may be formed from, for example, copper, a copper alloy, aluminum, an aluminum alloy, or the like. The insulator 232 may be formed from polyethylene, cross-linked polyethylene, or the like. In the example shown in FIG. 1, the third electric wire 23 has a smaller diameter than that of the first electric wire 21 and the second electric wire 22. Further, in FIG. 1, the diameter of the third electric wire 23 is substantially equal to that of each of the two insulated electric wires 240 forming the twisted pair wire 24. Alternatively, the diameter of the third electric wire 23 may differ from the diameter of each of the two insulated electric wires 240 forming the twisted pair wire 24. Specifically, the third electric wire 23 may be a ground electric wire (also referred to as drain electric wire or earth electric wire), a signal wire, or the like.

The electric wire bundle 2 includes the wire-shaped interposed material 25 that is not an electric wire. The wire-shaped interposed material 25 is wire-shaped and formed from a polymer. Examples of the polymer may include a resin such as polyolefin (polyethylene, polypropylene, or the like), polyester (polyethylene terephthalate, or the like), rubber, and the like. The polymer may be cross-linked. Further, the wire-shaped interposed material 25 may be, for example, cord-like, rod-like, or be fibrous and include filaments or the like formed from the above-described polymer.

The outer layer sheath 3 covers the electric wire bundle 2. More specifically, the outer layer sheath 3 entirely covers the first electric wire 21, the second electric wire 22, the twisted pair wire 24, the third electric wire 23, and the wire-shaped interposed material 25. The outer layer sheath 3 may be formed from polyurethane resin or the like.

In a cross-sectional view (orthogonal to cable axis) of the electric wire bundle 2, the twisted pair wire 24 is arranged at one side relative to a center line L that connects the center of the first electric wire 21 and the center of the second electric wire 22. Further, the third electric wire 23 and the wire-shaped interposed material 25 are arranged at the other side relative to the center line L. In other words, the third electric wire 23 and the wire-shaped interposed material 25 are spaced apart from the twisted pair wire 24 with the first electric wire 21 and the second electric wire 22 serving as a partition wall. Further, in the example shown in FIG. 1, the first electric wire 21 is in contact with the second electric wire 22.

The operation and advantages of the composite cable 1 will now be described. In the composite cable 1, the third electric wire 23 is arranged in the electric wire bundle 2 in addition to the first electric wire 21, the second electric wire 22, and the twisted pair wire 24. The wire-shaped interposed material 25 is also arranged together with the third electric wire 23. Further, the third electric wire 23 and the wire-shaped interposed material 25 are arranged at the side of the first electric wire 21 and the second electric wire 22 opposite to the twisted pair wire 24. Thus, compared to when the wire-shaped interposed material 25 is not included, rigidity is evenly distributed in the circumferential direction of the composite cable 1. This reduces situations in which the cable is bent only in a certain direction. Therefore, compared to when the wire-shaped interposed material 25 is not included, the composite cable 1 reduces concentrated bending in a direction in which the rigidity is relatively low when the cable is repetitively bent and easily avoids wire breakage of the conductors 241 and 201.

Further, even when the composite cable 1 is fastened by a crimp of a bracket, the wire-shaped interposed material 25, which is formed from a polymer and arranged as described above, will deform to maintain the cable shape. Thus, compared to when the wire-shaped interposed material is 25 not included, the composite cable 1 readily maintains the cable shape and stabilizes the fastening force.

As shown in FIG. 1, in the composite cable 1, the third electric wire 23 and the wire-shaped interposed material 25 may be twisted together to form a strand. With this structure, when the wire-shaped interposed material 25 is arranged in the electric wire bundle 2, the wire-shaped interposed material 25 and the third electric wire 23 will not become separated. This improves the manufacturability of the composite cable 1.

In this case, the strand may have a substantially equal strand diameter as the twisted pair wire 24. This structure allows the strand and the twisted pair wire 24 to be substantially symmetric in shape with respect to the center line L, which connects the center of the first electric wire 21 and the center of the second electric wire 22. In this manner, the two sides of the center line L are balanced, and the cable will be readily be bent uniformly in the circumferential direction of the cable. Therefore, compared to when the wire-shaped interposed material 25 is not included, this structure further reduces concentrated bending in a direction in which the rigidity is relatively low when the cable is repetitively bent. This further avoids wire breakage of the conductors 241 and 201. Furthermore, the structure, in which the strand and the twisted pair wire 24 are substantially symmetric in shape with respect to the center line L, readily reduces unevenness in the appearance of the final composite cable 1.

In the composite cable 1, the wire-shaped interposed material 25 may have substantially equal diameter as the third electric wire 23. This structure facilitates twisting of the third electric wire 23 and the wire-shaped interposed material 25 when forming a strand. Also, this structure readily distributes rigidity uniformly in the circumferential direction of the cable and reduces concentrated bending in a certain direction when the cable is bent.

In the composite cable 1, the first electric wire 21, the second electric wire 22, the twisted pair wire 24, the third electric wire 23, and the wire-shaped interposed material 25 may be twisted together. In other words, the electric wires forming the electric wire bundle 2 and the wire-shaped interposed material 25 may be twisted together in a bundled state. In this structure, the twisting readily reduces the strand diameter of the cable. The above-described structure also includes a structure in which the third electric wire 23 and the wire-shaped interposed material 25 are twisted together into a strand. That is, the above-described structure includes a structure in which the first electric wire 21, the second electric wire 22, the twisted pair wire 24, and a strand, which is formed by twisting the third electric wire 23 and the wire-shaped interposed material 25, are twisted together in a bundled state.

The composite cable 1 may include a separator layer 4 wound around the circumferential surface of the electric wire bundle 2. This structure hinders adhesion of the various members forming the electric wire bundle 2 with the outer layer sheath 3 and the inner layer sheath 5, which will be described later. Further, this structure avoids untwisting of the various members forming the electric wire bundle 2 that are twisted in a bundled state. Specifically, the separator layer 4 may be formed by winding a tape member or the like around the circumferential surface of the electric wire bundle 2. The material of the separator layer 4 may be, for example, paper, a resin, or the like.

When the composite cable 1 includes the separator layer 4, the cross-sectional shape of the separator layer 4 does not have to be circular.

When the composite cable 1 includes the separator layer 4, the separator layer 4 may include an inner space 20. This structure allows the electric wires to move in the space 20 when the cable is bent thereby improving the bending resistance. Further, this structure reduces the force adhering the electric wires to the outer layer sheath 3 and the like and allows the outer layer sheath 3 and the like to be easily removed when necessary.

The composite cable 1 may include the inner layer sheath 5 between the inner surface of the outer layer sheath 3 and the electric wire bundle 2. This structure reduces unevenness in the surface shape of the electric wire bundle 2 so that the cross-sectional shape of the cable becomes closer to a circle before the outer layer sheath 3 is formed. Thus, this structure allows the composite cable 1 to have a circular cross section. When the inner layer sheath 5 has a circular contour in a cross-sectional view of the composite cable 1, the advantage described above will be ensured. The inner layer sheath 5 may be formed from polyethylene, cross-linked polyethylene, or the like.

FIG. 1 shows a specific example in which the inner layer sheath 5 covers the separator layer 4, which is wound around the circumferential surface of the electric wire bundle 2. With this structure, even when the shape of the separator layer 4 is not circular in a cross-sectional view, the inner layer sheath 5 allows the cross-sectional shape of the cable to become closer to a circle before the outer layer sheath 3 is formed. Thus, the composite cable 1 will easily obtain a circular cross section.

The composite cable 1 may be configured so that the wire-shaped interposed material 25 does not break when wire breakage occurs in the conductor of the twisted pair wire 24. With this structure, the wire-shaped interposed material 25 functions as a tension member. This avoids a situation in which the broken parts of a conductor become disconnected and non-conductive. That is, the wire-shaped interposed material 25 allows broken conductor parts to remain in contact with each other. Thus, this structure avoids signal loss, power loss, and the like that would be caused by wire breakage of conductors and improves the reliability of the composite cable 1.

Figure 2:
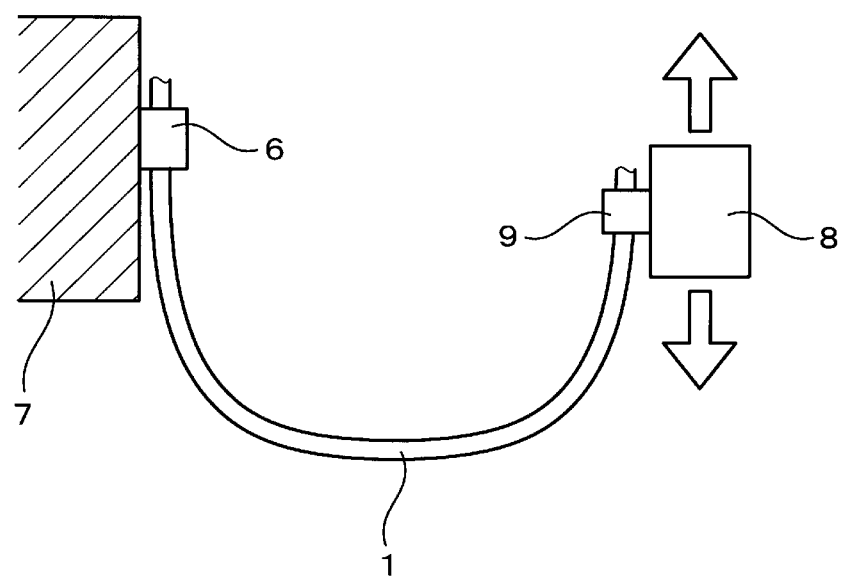
FIG. 2 is a schematic diagram illustrating an application example of the composite cable in accordance with the first embodiment.

As exemplified in FIG. 2, the composite cable 1 may be used in a state in which one end of the cable is crimped by a crimp (not shown) of a bracket 6 and fastened to a fastening portion 7. Further, the other end of the cable is attached to a vibration portion 8 that vibrates in the vertical direction. This structure sufficiently obtains the above-described advantages. In FIG. 2, the composite cable 1 is bent downwardly into a U-shape, but the composite cable 1 may be bent upwardly into a reverse U-shape.

The composite cable 1 may be for use with an electric brake of an automobile. This structure ensures that the above-described advantages are obtained.

Typically, in an electric brake of an automobile, a motor of a brake caliper is actuated directly or indirectly by a main electronic control unit of the automobile in correspondence with a depressing force applied by a driver to convert the rotational force of the motor to a mechanical pressing force. In this manner, a brake pad is pressed against a brake disc (in case of disc brake) or a brake shoe is pressed against a brake drum (in case of drum brake) to perform braking.

When the composite cable 1 is applied to an electric brake of an automobile, one end of the composite cable 1 may be fastened to a vehicle body or a chassis, and the other end of the composite cable 1 may be attached to the periphery of a wheel that vibrates in the vertical direction. Specifically, the periphery of a wheel may be a position located below a spring of a suspension in an automobile (undercarriage of automobile). The one end of the composite cable 1 may be fastened at one or more positions. Further, the other end of the composite cable 1 may be fastened at one or more positions. The bracket 6 may be used for fastening the composite cable 1, and an attaching bracket 9 or the like may be used for attaching the composite cable 1. The attaching bracket 9 may also include a crimp (not shown) for crimping the composite cable 1.

When the composite cable 1 is applied to an electric brake of an automobile, the first electric wire 21 and the second electric wire 22 may be configured to supply electric power for driving a motor included in a brake caliper of the electric brake of the automobile. Further, the twisted pair wire 24 may be configured to transmit electric signals related to the rotation speed of a wheel and/or at least transmit electric signals related to control of the motor.

In the example shown in FIG. 1, the electric wire bundle 2 includes one wire-shaped interposed material 25. In addition to the wire-shaped interposed material 25, the electric wire bundle 2 may further include one or more wire-shaped interposed materials (not shown) as long as bending is not concentrated in a certain direction when the cable is bent and the fastening force stability is improved when the cable is crimped by the bracket 6 or the attaching bracket 9. When multiple wire-shaped interposed materials are included, the wire-shaped interposed materials may have the same diameter or different diameters. In the same manner, in addition to the twisted pair wire 24, the electric wire bundle 2 may further include one or more signal wires (not shown). In addition to the twisted pair wire 24, the electric wire bundle 2 may further include a twisted pair wire (not shown).

Further, in the composite cable 1, the twisted pair wire 24 may be covered by a shield conductor (not shown), a twisted pair wire sheath (not shown), or the like. In this case, the shape sustainability of the twisted pair wire 24 is improved. Thus, even when the composite cable 1 is vibrated vertically in a bent state, wire breakage resistance of the twisted pair wire 24 will be improved.

Second Embodiment

A composite cable of a second embodiment will now be described with reference to FIG. 3. From the second embodiment, same reference numerals are given to those components that are the same as the corresponding components of the above-described embodiment, unless otherwise specified.

Figure 3:
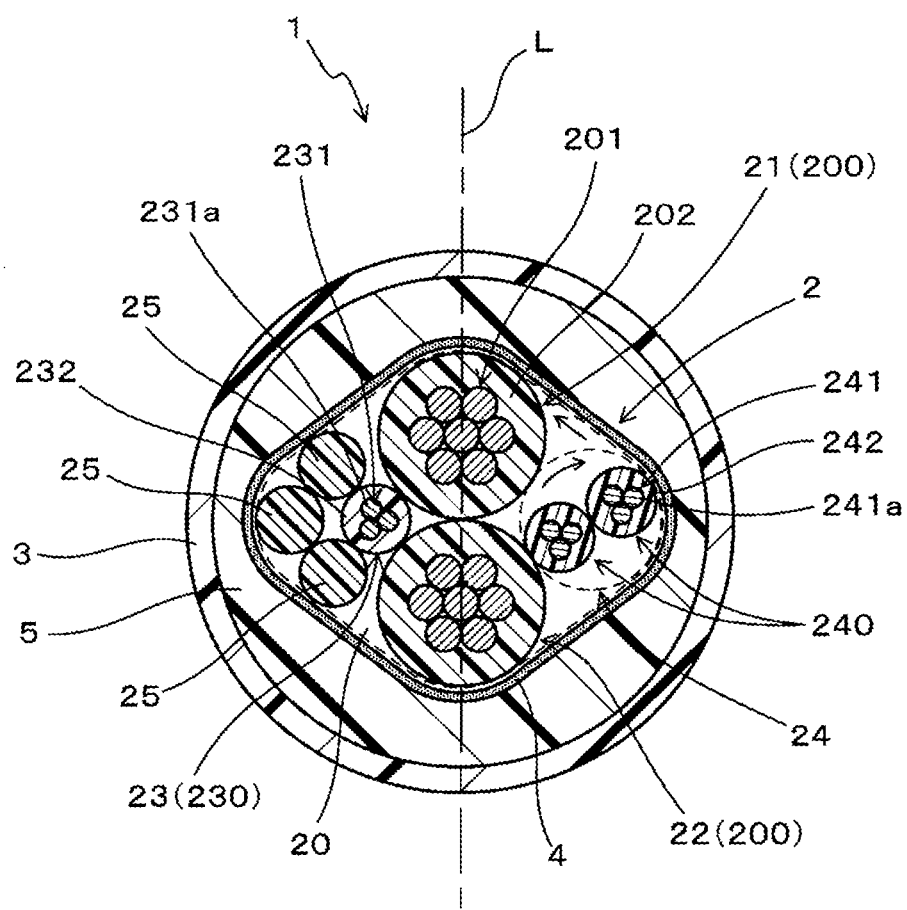
FIG. 3 is a schematic diagram showing the cross section of a composite cable in accordance with a second embodiment.

As exemplified in FIG. 3, in the composite cable 1 of the present embodiment, the third electric wire 23 is not twisted together with the wire-shaped interposed materials 25. With this structure, untwisting is not performed when forming a harness. Further, the third electric wire 23 is straighter than when the third electric wire 23 and the wire-shaped interposed material 25 are twisted together. This readily reduces inductance.

Further, FIG. 3 shows an example in which the third electric wire and three wire-shaped interposed materials are arranged at one side relative to the center line L. The number of the wire-shaped interposed materials may be one or two. The other configuration, operation, and advantages are the same as the first embodiment.

Experimental Example

A composite cable having the structure shown in FIG. 1 was prepared. This composite cable is referred to as sample 1. The wire-shaped interposed material was formed from polyethylene. Also, sample 1C of the composite cable was prepared. Sample 1C is similar to sample 1 except in that the wire-shaped interposed material was not included, the third electric wire was solely arranged at the side of the first electric wire and the second electric wire opposite to the twisted pair wire, and a separator layer was wound around the circumferential surface of the electric wire bundle in which the wire-shaped interposed material was not included.

The composite cables were bent into a U-shape and one end of each cable was fastened to a fastening portion. Further, the other end of each cable was fastened to a movable portion that can be vibrated in the vertical direction. Such a fastened state simulates a case where one end of the cable is fastened to a vehicle body or a chassis and the other end of the cable is fastened to the periphery of a wheel. In the above-described state, a fastening point of the fastening portion and a center of vertical vibration of the movable portion were set to be located at the same height. Further, the distance between the fastening point of the fastening portion and the center of vertical vibration of the movable portion was set to 100 mm. The length of the cable was set to 300 mm. The movable portion was set to have a vertical movement amount of ±80 mm.

Under the above-described conditions, the movable portion was moved up and down to count the number of times the composite cable was bent until the conductor of the twisted pair wire in each sample broke. As a result, the composite cable of sample 1 was bent more times than the composite cable of sample 1C before the conductor of the twisted pair wire broke. Further, in the composite cable of sample 1, the wire-shaped interposed material was not broken when the conductor in the twisted pair wire broke. The result indicates that the wire-shaped interposed material functions as a tension member in the composite cable of sample 1.

Also, after the conductor broke in the composite cable of sample 1 during the experiment, the conduction state of the twisted pair wire was checked. It was found that the twisted pair wire was still conductive. This is because the wire-shaped interposed material functioning as a tension member kept the broken parts of the conductor in contact with each other. In the present experimental example, wire breakage did not occur in the conductors of the first electric wire and the second electric wire because each of the first electric wire and the second electric wire had a larger conductor cross-sectional area than each signal wire in the twisted pair wire. Moreover, the first electric wire and the second electric wire were located closer to the cable center than the twisted pair wire.

The present disclosure is not limited the above-described embodiments and the experimental example, but may be modified without departing from the scope of the invention. The configuration of the embodiments and the experimental example may be combined as needed.

The invention claimed is:
1. A composite cable, comprising:
an electric wire bundle; and
an outer layer sheath that covers the electric wire bundle, wherein:
the electric wire bundle includes a single-core first electric wire, a single-core second electric wire, a double-core twisted pair wire, a single-core third electric wire, and a wire-shaped interposed material formed in a shape of a wire using a polymer;
in a cross-sectional view of the electric wire bundle,
the twisted pair wire is arranged at one side relative to a center line connecting a center of the first electric wire and a center of the second electric wire while none of single-core third electric wires including the single-core third electric wire and none of wire-shaped interposed materials including the wire-shaped interposed material formed in a shape of a wire using a polymer are arranged at said one side,
the third electric wire and the wire-shaped interposed material are arranged at the other side relative to the center line while none of double-core twisted pair wires including the double-core twisted pair wire is arranged at the other side,
the third electric wire and the wire-shaped interposed material are twisted together to form a strand, and
the strand has a strand diameter that is substantially equal to that of the twisted pair wire.

2. The composite cable according to claim 1, wherein the wire-shaped interposed material has a diameter that is substantially equal to that of the third electric wire.

3. The composite cable according to claim 1, wherein the first electric wire, the second electric wire, the twisted pair wire, the third electric wire, and the wire-shaped interposed material are twisted together.

4. The composite cable according to claim 1, wherein the wire-shaped interposed material does not break when wire breakage occurs in a conductor of the twisted pair wire.

5. The composite cable according to claim 1, comprising a separator layer wound around a circumferential surface of the electric wire bundle.

6. The composite cable according to claim 5, wherein an inner side of the separator layer includes a space.

7. The composite cable according to claim 1, comprising an inner layer sheath between an inner surface of the outer layer sheath and the electric wire bundle.

8. The composite cable according to claim 7, wherein the inner layer sheath has a contour that is circular in the cross-sectional view.

9. The composite cable according to claim 1, wherein
the first electric wire and the second electric wire are each a power line, and
the twisted pair wire is formed by twisting two signal wires.

10. The composite cable according to claim 1, wherein the composite cable is configured for use with an electric brake of an automobile.

11. A composite cable, comprising:
an electric wire bundle; and
an outer layer sheath that covers the electric wire bundle, wherein:
the electric wire bundle includes a single-core first electric wire, a single-core second electric wire, a double-core twisted pair wire, a single-core third electric wire, and a wire-shaped interposed material formed in a shape of a wire using a polymer;
in a cross-sectional view of the electric wire bundle,
the twisted pair wire is arranged at one side relative to a center line connecting a center of the first electric wire and a center of the second electric wire while none of single-core third electric wires including the single-core third electric wire and none of wire-shaped interposed materials including the wire-shaped interposed material formed in a shape of a wire using a polymer are arranged at said one side, the third electric wire and the wire-shaped interposed material are arranged at the other side relative to the center line while none of double-core twisted pair wires including the double-core twisted pair wire is arranged at the other side, the composite cable further comprising a separator layer wound around a circumferential surface of the electric wire bundle, wherein the separator layer has a contour that is non-circular in the cross-sectional view.

\* \* \* \* \*